(12) United States Patent
Endres

(10) Patent No.: US 6,868,849 B1
(45) Date of Patent: Mar. 22, 2005

(54) ADJUSTABLE CAMPFIRE TRIPOD

(76) Inventor: Jerry Endres, 501 Raymond Rd., Waunakee, WI (US) 53597

( * ) Notice: Subject to any disclaimer, the term of this patent is extended or adjusted under 35 U.S.C. 154(b) by 0 days.

(21) Appl. No.: 10/636,824

(22) Filed: Aug. 7, 2003

(51) Int. Cl.[7] ............................................. A47J 37/07
(52) U.S. Cl. .................................... 126/25 A; 126/9 R
(58) Field of Search .............................. 126/9 R, 25 A, 126/30; 248/163.2, 320, 327, 328; 211/207, 211/209

(56) References Cited

U.S. PATENT DOCUMENTS

| | | | |
|---|---|---|---|
| 366,833 A | | 7/1887 | Hipwell |
| 2,827,846 A | * | 3/1958 | Karkling ....................... 126/30 |
| 4,024,851 A | | 5/1977 | Boda |
| 4,120,280 A | | 10/1978 | Iverson |
| 4,146,010 A | | 3/1979 | Manska |
| 4,732,138 A | | 3/1988 | Vos |
| D337,933 S | * | 8/1993 | Gryz ........................... D7/332 |
| 5,931,085 A | * | 8/1999 | Benzschawel ............ 126/25 A |
| 6,070,571 A | * | 6/2000 | Bradbury ................... 126/25 A |
| 6,298,843 B1 | * | 10/2001 | Olsen et al. .............. 128/25 A |

FOREIGN PATENT DOCUMENTS

CA         1090669 A    * 12/1980

* cited by examiner

*Primary Examiner*—Sara Clarke
(74) *Attorney, Agent, or Firm*—Joseph T. Leone, Esq.; DeWitt Ross & Stevens S.C.

(57) ABSTRACT

The present invention is directed to an apparatus for use in cooking over an open fire. Specifically, the invention discloses a tripod having a grill suspended therefrom. The tripod includes an elongate adjustment rod with a distantly situated handle. By attaching the suspension line, holding the grill to the handle, which is slidingly affixed to one leg of the tripod, the height of the grill over the fire can be changed. This arrangement allows the grill to be adjusted over the fire to accommodate the heat of the fire or to provide a preferred cooking temperature for the articles on the grill without adjusting the grill directly or having to touch the hot surfaces near the fire.

12 Claims, 1 Drawing Sheet

ADJUSTABLE CAMPFIRE TRIPOD

FIELD OF THE INVENTION

The invention relates generally to a device for cooking and particularly to a device for adjustably supporting a grill above a fire.

BACKGROUND OF THE INVENTION

Cooking over an open fire is one of the oldest ways to cook. Because the temperature of a fire can vary significantly depending on the size of the fire and the fuel used, many methods have been devised to support the cooking surface above the flames. While a fireplace provides a permanent structure onto which cooking apparatus can be affixed, no such structure is available for a campfire made in a firepit.

Cooking in primitive conditions has its own requirements. For example, campfire cooking requires that a grill or other cooking surface be close to the fire. This either requires a pan or griddle to rest on a rock near the fire or requires allowing a large bed of coals to accumulate so that a cooking implement can be set directly into the coals. In order to cook over an open flame, it is necessary to have the cooking surface suspended by some method over the flame so as to take advantage of the hottest part of the fire. In addition, while apparatus, such as tripods, for suspending cooking utensils over a fire are not new, their use has certain requirements. For example, the cooking apparatus needs to be fireproof. It is also expected that most parts of the apparatus will become too hot to touch directly. In addition, because an open fire is, almost by definition, not a constant heat source, the user will need some way to adjust the cooking heat resulting from the flame. While one solution would be to disperse the fuel when the fire gets too hot, such a solution would require re-kindling of the fire should the user wish more heat.

Other solutions have been attempted. For example, U.S. Pat. No. 366,833 to Hipwell describes a tripod support for cooking over an open fire that includes a three legged stand with a planar cooking surface suspended underneath the stand by use of three separate chains.

U.S. Pat. No. 4,024,851 to Boda describes a tripod for cooking in which one of the legs is larger and designed to receive all other components of the device. The tripod includes a square grill suspended at the corners by four cables. The cables are attached to one end of a grill-hanging cable. The second end of the hanging cable terminates in a cable hook. The large leg includes a guide for the grill-hanging cable. The cable hook fits into receptacles along the length of the large leg. The height of the grill is then adjusted by moving the cable hook up and down the length of the large leg.

U.S. Pat. No. 4,146,010 to Manska describes an outdoor grill tripod. The tripod includes three legs connected at the apex. A planar grilling surface is suspended from three chains, each chain individually attached to one of the legs by a suspension lock. Each of the chains is separately adjustable by sliding the suspension lock up and down the leg.

U.S. Pat. No. 4,732,138 to Vos describes a campfire cooker which includes a tripod from which is supported at least one cooking surface. Further, the device includes a firebox, which may be on wheels and which has receptacles for accepting the ends of the tripod legs. The Vos device allows the suspension of two different cooking surfaces by two different mechanisms. Vos describes a lower grill suspended by three chains, each chain adjustably connected to a leg, similar to Manska. Vos also describes an upper cooking surface in which the grill is suspended by three individual support chains, spaced equidistant around the circular grill periphery. The support chains are connected together at a suspension ring, which is further connected to a fourth support chain. The fourth support chain passes up and through a second suspension ring, which is suspended beneath an apical locking plate, which joins the legs. The chain can then be fixed on one of the legs by use of a locking bracket. Thus, as in Boda, the height of the second grill above the fire can be adjusted by moving a single locking bracket up and down the leg of the tripod.

U.S. Pat. No. 4,120,280 to Iverson describes a portable tripod for use in cooking over an open fire. The tripod has telescoping legs connected at an apical plate. A grill is connected to one end of three short chains spaced equidistantly around the grill. The chains are connected at their other end to a support chain. As in Vos, the support chain passes up through a suspension ring attached to the apical plate and is fixed along one leg by the use of a slide lock. By moving the slide lock up and down the leg, the height of the grill over the fire is adjusted.

While the cooking devices described above provide a platform for cooking over an open fire, they lack the flexibility and safety that is desirable when cooking over open flames. Specifically, all of the tripods discussed provide a means of adjusting the cooking surface by moving a bracket up or down the length of a leg of the apparatus. This method of adjustment has at least two major hazards. First, because any object suspended over a hot fire will itself become hot, there is a real danger of burns should an attempt be made to adjust the grill after the fire becomes hot. Second, because the objects on the grill are suspended from the tripod, attempting to move the cooking surface with heavy objects on it, by adjusting a hot slide lock along the leg, risks upsetting the entire apparatus. This situation could result in severe injuries.

Therefore, there is a need for an apparatus that allows cooking over an open fire that is safe and easy to use. Preferably, the apparatus can be used while cooking is in progress to obtain an optimum height for the cooking surface as the fire burns, without further increasing the risk or adding danger to the experience of campfire cooking.

SUMMARY OF THE INVENTION

Cooking over an open flame generally necessitates a large fire with high heat. Accordingly, it is an object of the invention to provide a cooking apparatus for use with an open fire, which allows adjustment of the cooking surface over the flames without requiring the user to directly manipulate the chains supporting the cooking surface.

In a preferred embodiment, the invention comprises a cooking apparatus for cooking over an open fire. The cooking apparatus comprises a self-supporting device having a top plate and at least three legs. Each leg has a first end and a second end, with each leg being affixed to the top plate at its first end. In addition, the invention comprises an adjustment rod. The adjustment rod also has a first end and a distantly removed second end. The adjustment rod is slidingly connected to one leg near its first end via an aperture or hole passing through the first end of the adjustment rod while the second end comprises a grip or handle. The aperture is dimensioned and configured to pass around one of the legs. The aperture is further configured so that the adjustment rod is movable between a first position, wherein the periphery of the aperture frictionally engages the leg and prevents movement of the adjustment rod, and a second position, wherein the adjustment rod slides freely about the leg. Also included is a planar grilling surface. The grilling surface is attached around its periphery to at least three support lines. A suspension ring is fastened to the top plate, and a suspension line having a first end and a second end passes through the suspension ring. The support lines are connected in similar length to the first end of the suspension line while the second end of the suspension line is connected to the first end of the adjustment rod (proximate to the aperture). By sliding the adjustment rod along the length of the leg, the height at which the grilling surface is suspended over the fire moves up or down.

In another preferred embodiment, the invention comprises a cooking apparatus for cooking over an open fire. The cooking apparatus comprises a self-supporting device having a top plate and at least three legs. Each leg has a first end and a second end, with each leg being affixed to the top plate at its first end. In addition, the invention comprises an adjustment rod. The adjustment rod has a first end and a distantly removed second end. The adjustment rod is slidingly connected to one leg near its first end via an aperture or hole passing through the first end of the adjustment rod while the second end comprises a grip or handle. The aperture is dimensioned and configured to pass around one of the legs. The aperture is further configured so that the adjustment rod is movable between a first position, wherein the periphery of the aperture frictionally engages the leg and prevents movement of the adjustment rod, and a second position, wherein the adjustment rod slides freely about the leg. Also included is a planar grilling surface. The grilling surface is attached around its periphery to at least three support lines. A pulley is fastened to the top plate, and a suspension line having a first end and a second end passes through the pulley. The support lines are connected in similar length to the first end of the suspension line while the second end of the suspension line is connected to the first end of the adjustment rod (proximate to the aperture). By sliding the adjustment rod along the length of the leg, the height at which the grilling surface is suspended over the fire moves up or down.

In yet another preferred embodiment, the invention comprises a cooking apparatus for cooking over an open fire. The cooking apparatus comprises a self-supporting device having a top plate and at least three legs. Each leg has a first end and a second end, with each leg being affixed to the top plate at its first end. In addition, the invention comprises an adjustment rod. The adjustment rod has a first end and a distantly removed second end. The adjustment rod is slidingly connected to one leg near its first end via an elliptical aperture passing through the first end of the adjustment rod while the second end comprises a grip or handle. The aperture is dimensioned and configured to pass around one of the legs. The aperture is further configured so that the adjustment rod is movable between a first position, wherein the periphery of the aperture frictionally engages the leg and prevents movement of the adjustment rod, and a second position, wherein the adjustment rod slides freely about the leg. Also included is a planar grilling surface. The grilling surface is attached around its periphery to at least three support lines. A pulley is fastened to the top plate, and a suspension line having a first end and a second end passes through the pulley. The support lines are connected in similar length to the first end of the suspension line while the second end of the suspension line is connected to the first end of the adjustment rod (proximate to the aperture). By sliding the adjustment rod along the length of the leg, the height at which the grilling surface is suspended over the fire moves up or down.

The design of the present invention is advantageous due to the ability to adjust the height of the cooking surface without meddling with attachments at the legs as is true for other adjustable grills. In short, the design of the adjustment rod allows the height of the grill to be adjusted from a distance using the adjustment handle, thereby increasing the safety and comfort of the operator.

These advantages result in greater utility for the operator because the cooking apparatus is easier and safer to use than those of previous apparatus. Cooking over an open fire is easier and less risky with the present device because the grill height above the flames can be adjusted while the user remains a safe distance from the fire.

The objects and advantages of the invention will appear more fully from the following detailed description of the preferred embodiment of the invention made in conjunction with the accompanying figures.

DETAILED DESCRIPTION OF THE INVENTION

Figure 1:
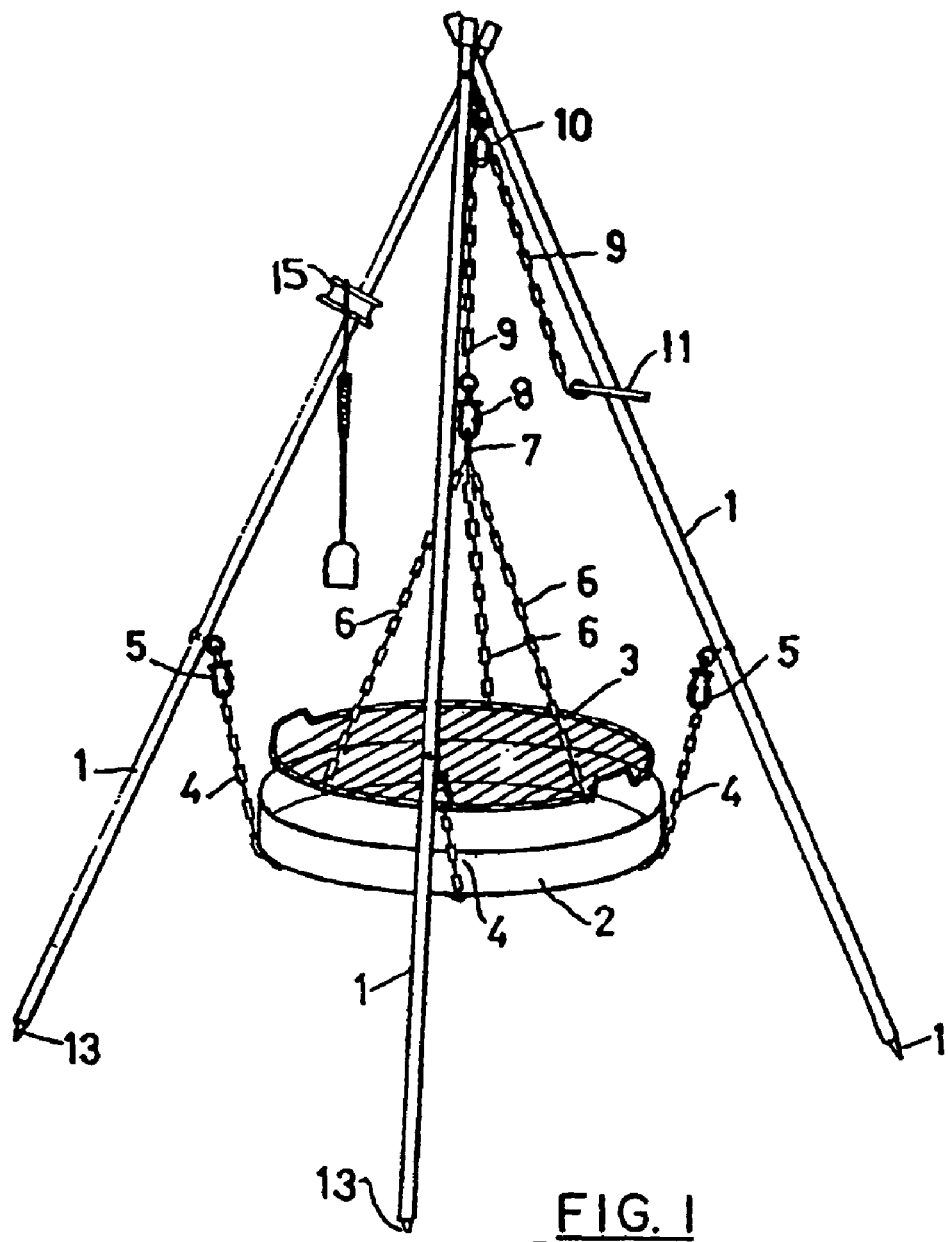
FIG. 1 is a side elevation of the invention.

FIG. 1 illustrates a preferred embodiment of the invention. The invention comprises a cooking apparatus 10 for use over open flames. As shown, the apparatus 10 comprises a tripod for suspending items to be cooked over a fire. The apparatus includes a top plate 15, the top plate 15 being generally round and planar with a top surface and a bottom surface. The bottom surface of the top plate 15 has three leg openings 20 spaced around the periphery of the top plate 15. The leg openings 20 are dimensioned and configured to provide a receptacle of the appropriate bore for accepting the legs 30, which fit within the leg openings 20. In one favored embodiment, the leg openings 20 may comprise housings with a threaded aperture (not shown) in the side of each housing such that a screw can be threaded in, fixing the legs 30 in place. In another preferred embodiment, the legs 30 are tapered to a planar shape at the end, the planar ends of the legs fitting into slotted leg openings 20 passing through the end plate 15 so as to be securely affixed to the end plate and easily removable as well.

Figure 2:
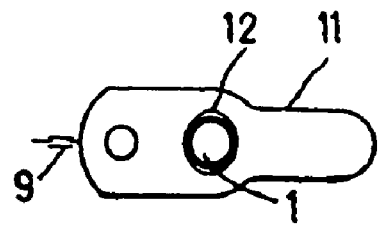
FIG. 2 is an enlarged, partial side elevation of the top part of the invention, illustrating the suspension ring connected to the top plate.

FIG. 2 represents an enlarged view of the side elevation of FIG. 1, so as to illustrate in detail the upper portion of the tripod. As shown, in the center of the top plate 15 is a hole 25 through which a suspension ring 35 is secured. As shown in FIGS. 1 and 2, a suspension line 40 passes through the suspension ring 35 and is secured at the first end to at least three support lines 50 of the same length. Each support line 50 is attached at its second end to a cooking surface or grill 60 as shown in FIG. 1. In yet another preferred embodiment, there are four support lines 50 (not shown) attaching the grilling surface to the suspension line 40. The support lines 50 may be connected to the grill 60 directly or by the use of connectors such as 'S' hooks (not shown). In one preferred embodiment, illustrated in FIGS. 1 and 2, the suspension line 40 and support lines 50 are fabricated from metal chains of appropriate diameter. In other embodiments, the suspension line 40 and support lines 50 are made from any heat-resistant materials available that provide for pliable, high-temperature support. For example, metal cables or metal tape would provide for pliable heat-resistant support for the cooking surface 60. In addition, the suspension line 40 and the support lines 50 may be composed of different materials such that the suspension line 40 is composed of chain-like material while the support lines 50 are composed of cable or metal tape. Further, in the preferred embodiment illustrated in FIGS. 1 and 2, the suspension ring 35 is a pulley, allowing greater ease of movement of the suspension line 40 through the ring 35. However, the suspension ring 35 may also be a simple ring connector, allowing free passage of the suspension line 40 through the ring.

While the first end of the suspension line 40 is connected to the support lines 50, the second end of the suspension line 40 connects to the first end of an adjustment rod 70 as shown in FIG. 1. The adjustment rod 70 has a first end and a distantly removed second end. The first end of the adjustment rod 70 is secured to the suspension line 40 at its first end. Near the end of the first end of the adjustment rod 70 is an elliptical opening or aperture 75 in the adjustment rod 70. The aperture 75 is dimensioned and configured such that the minimum diameter is large enough to slide freely about the circumference of one of the legs 30. The second end of the adjustment rod 70 provides a handle or grip 80, which is directed away from the fire. When the first end of the rod 70 is pulled upward by the weight of the grill 60, the friction of the aperture 75 being pulled upward against the leg 30 firmly fixes the rod 70 and, thus, the grill 60 in place. When the handle or grip 80 end of the rod 70 is lifted, the aperture 75 slides freely up and down the leg 30. Because the rod 70 is connected to the suspension line 40, when the handle 80 is lifted and the rod 70 is slid down the leg 30, the grill 60 is raised, and when the rod 70 is slid up the leg 30, the grill 60 is lowered over the fire.

This design allows the operator to adjust the height of the grill 60 over the fire with a single adjustment element, at a distance safely removed from the fire. Importantly, this adjustment can be made without directly touching the support tripod and without getting any closer to the fire than necessary. Further, the safety of the apparatus is increased because the resting position of the rod 70, due to the tension of the grill 60, supported by the suspension line 40, is arrested in place until the handle 80 at the second end of the rod 70 is actively raised.

It is another feature of the invention that the grill 60 is modified for cooking on a tripod where movement may set the grill in motion. Accordingly, the grill 60 is provided with a raised lip or flange 65 around its circumference such that items will not roll off the cooking surface should the grill 60 be set in motion. In a preferred embodiment, the lip 65 is approximately one-half inch. However, other sizes in the height of the lip are contemplated.

The apparatus of the invention can be made of any materials so long as they are fireproof or fire-resistant. For example, the legs 30 may be made of any metal, preferably steel pipe. In some circumstances, where the fire is small, the legs could even be metal-clad wood. Similarly, the support lines 50 and suspension line 40 may be made of chains or metal cables such as aluminum or steel wire or cable. Further, while in some versions the suspension ring 35 may be a simple circular ring, it is contemplated that the suspension ring 35 may comprise a pulley such that the suspension line 40 more smoothly adjusts the grill 60.

It is understood that the invention is not confined to the particular construction and arrangement of parts herein illustrated and described, but embraces such modified forms thereof as come within the scope of the following claims.

What is claimed is:

1. A cooking apparatus comprising:
   a top plate;
   at least three legs, wherein each leg has a first end and a second end, each leg being affixed to the top plate at its first end;
   an adjustment rod, the adjustment rod having a first end and a distantly removed second end, the adjustment rod slidingly connected to one leg at about the first end of the leg by an aperture passing through the first end of the adjustment rod;
   a handle disposed at the second end of the adjustment rod, wherein the handle is substantially larger than the plate;
   a planar grilling surface, the grilling surface being attached around its periphery to at least three support lines;
   a suspension ring fastened to the top plate;
   a suspension line, the suspension line having a first end and a second end, wherein the suspension line passes through the suspension ring and wherein the support lines are connected to the first end of the suspension line and the second end of the suspension line is connected to the first end of the adjustment rod; and
   whereby adjusting the adjustment rod alters the height of the grilling surface suspended over the fire.

2. The apparatus of claim 1, wherein the suspension ring is a pulley.

3. The apparatus of claim 1, wherein the suspension line is fabricated from the group consisting of: chain, cable, metal fibers and combinations thereof.

4. The apparatus of claim 1, wherein the support lines are fabricated from the group consisting of: chain, cable, metal fibers and combinations thereof.

5. The adjustment rod of claim 1, wherein the aperture passing through the first end of the adjustment rod is elliptical.

6. A cooking apparatus comprising:
   a top plate;
   at least three legs, wherein each leg has a first end and a second end, each leg being affixed to the top plate at its first end;
   an adjustment rod, the adjustment rod having a first end and a distantly removed second end, the adjustment rod slidingly connected to one leg at about the first end of the leg by an aperture passing through the first end of the adjustment rod;
   a handle disposed at the second end of the adjustment rod, wherein the handle is substantially larger than the plate;
   a planar grilling surface, the grilling surface being attached around its periphery to at least three support lines;
   a pulley fastened to the top plate; and
   a suspension line, the suspension line having a first end and a second end, wherein the suspension line passes through the pulley, and wherein the support lines are connected to the first end of the suspension line and the second end of the suspension line is connected to the first end of the adjustment rod;
   whereby adjusting the adjustment rod alters the height of the grilling surface suspended over the fire.

7. The apparatus of claim 6, wherein the suspension line is fabricated from the group consisting of: chain, cable, metal fibers and combinations thereof.

8. The apparatus of claim 6, wherein the support lines are fabricated from the group consisting of: chain, cable, metal fibers, and combinations thereof.

9. The adjustment rod of claim 6, wherein the aperture passing through the first end of the adjustment rod is elliptical.

10. A cooking apparatus comprising:
    a top plate;
    at least three legs, wherein each leg has a first end and a second end, each leg being affixed to the top plate at its first end;
    an adjustment rod, the adjustment rod having a first end and a distantly removed second end, the adjustment rod slidingly connected to one leg at about the first end by an aperture passing through the first end of the adjustment rod, wherein the aperture passing through the first end of the leg of the adjustment rod is elliptical;
    a handle disposed at the second end of the adjustment rod, wherein the handle is substantially larger than the plate;
    a planar grilling surface, the grilling surface being attached around its periphery to at least three support lines;
    a pulley, fastened to the top plate; and
    a suspension line, the suspension line having a first end and a second end, wherein the suspension line passes through the pulley, and wherein the support lines are connected to the first end of the suspension line and the second end of the suspension line is connected to the first end of the adjustment rod;
    whereby adjusting the adjustment rod alters the height of the grilling surface suspended over the fire.

11. The apparatus of claim 10, wherein the suspension line is fabricated from the group consisting of: chain, cable, metal fibers and combinations thereof.

12. The apparatus of claim 10, wherein the support lines are fabricated from the group consisting of: chain, cable, metal fibers and combinations thereof.

\* \* \* \* \*